United States Patent
Yamanaka et al.

(10) Patent No.: US 8,658,048 B2
(45) Date of Patent: Feb. 25, 2014

(54) METHOD OF MANUFACTURING MAGNETIC RECORDING MEDIUM

(75) Inventors: Kazuto Yamanaka, Sagamihara (JP); Shogo Hiramatsu, Kawasaki (JP)

(73) Assignee: Canon Anelva Corporation, Kawasaki-shi (JP)

( * ) Notice: Subject to any disclaimer, the term of this patent is extended or adjusted under 35 U.S.C. 154(b) by 53 days.

(21) Appl. No.: 13/285,304

(22) Filed: Oct. 31, 2011

(65) Prior Publication Data

US 2012/0103934 A1    May 3, 2012

(30) Foreign Application Priority Data

Nov. 2, 2010   (JP) .................................. 2010-246386

(51) Int. Cl.
*B44C 1/22*    (2006.01)

(52) U.S. Cl.
USPC ............... 216/22; 216/58; 216/67; 438/706; 438/710; 438/711; 438/712; 438/713; 438/715; 438/716

(58) Field of Classification Search
None
See application file for complete search history.

(56) References Cited

U.S. PATENT DOCUMENTS

| | | | |
|---|---|---|---|
| 7,470,374 B2 | 12/2008 | Hattori et al. | |
| 2006/0159940 A1* | 7/2006 | Bhatnagar et al. | 428/472 |
| 2007/0095291 A9* | 5/2007 | Hashikura et al. | 118/728 |
| 2009/0314740 A1* | 12/2009 | Ikemoto et al. | 216/22 |
| 2010/0025363 A1 | 2/2010 | Yamanaka et al. | |
| 2010/0028529 A1 | 2/2010 | Yamanaka et al. | |

FOREIGN PATENT DOCUMENTS

| | | |
|---|---|---|
| JP | 2001-156158 A | 6/2001 |
| JP | 2005-50468 A | 2/2005 |

* cited by examiner

*Primary Examiner* — Lan Vinh
*Assistant Examiner* — Jiong-Ping Lu
(74) *Attorney, Agent, or Firm* — Fitzpatrick, Cella, Harper & Scinto (57) ABSTRACT

The present invention aims to prevent decreases in etching rate due to adhesion of an etched film to a substrate holder. A method of manufacturing a magnetic recording medium includes: forming a first film on a substrate holder not yet having a substrate mounted thereon; mounting a substrate on the substrate holder having the first film formed thereon, the substrate having a resist layer formed on a multilayer film including a magnetic film layer, the resist layer having a predetermined pattern; and processing the magnetic film layer into a shape based on the predetermined pattern by performing dry etching on the substrate. The first film is a film that is not etched as easily as the films in the multilayer film to be removed by the dry etching.

3 Claims, 9 Drawing Sheets

FIG.1A

↓ RESIST BOTTOM REMOVAL (S101)

FIG.1B

↓ HARD MASK ETCHING (S102)

FIG.1C

↓ MASK ETCHING (S103)

FIG.1D

↓ HARD MASK REMOVAL (S104)

FIG.1E

↓ MAGNETIC LAYER ETCHING (S105)

FIG.1F

↓ MASK REMOVAL (S106)

FIG.1G

↓ BURIED LAYER
FORMATION (S107)

FIG.1H

FLATTENING (S108)

FIG.1I

PROTECTION FILM LAYER FORMATION (S109)

METHOD OF MANUFACTURING MAGNETIC RECORDING MEDIUM

BACKGROUND OF THE INVENTION

1. Field of the Invention

The present invention relates to a magnetic recording medium manufacturing method that can restrain processing variations and decreases in etching rate at the time of etching.

2. Description of the Related Art

In recent years, BPM (Bit Patterned Media), DTM (Discrete Track Media), and the like have been used as perpendicular magnetic recording media. In each of those media, a concave-convex pattern or grooves are formed in a magnetic film, and the concave portions or the grooves are filled with a nonmagnetic material, to prevent magnetic interference between adjacent cells. A method of manufacturing such magnetic recording media is disclosed in Japanese Patent Application Laid-Open No. 2005-50468.

To process a magnetic film into a concave-convex pattern, a mask or a resist processed into a concave-convex pattern needs to be formed on the magnetic film, and the pattern needs to be transferred to the magnetic film by etching. The resist or mask is designed to increase the selectivity with respect to the adjacent layers and maintain the shape of the pattern. By maintaining the shape of the pattern, the magnetic film is processed to have concavities and convexities with predetermined depths and widths, and a higher magnetic recording density can be achieved.

To form concavities and convexities, the portions of the film located at the bottoms of grooves need to be etched by the amount equivalent to a predetermined film thickness. In that case, however, the etching amount varies depending on the film adhering state at portions (such as a substrate holder) surrounding the substrate, in addition to the discharge conditions.

To counter this problem, Japanese Patent Application Laid-Open No. 2001-156158 discloses a technique of removing the film adhering to a substrate holder by performing sputter etching on the substrate holder that is not holding a substrate.

By the sputter etching disclosed in Japanese Patent Application Laid-Open No. 2001-156158, various films adhering to the substrate holder can be removed. However, the etched films re-adhere to the substrate holder, and cannot be completely removed.

BRIEF SUMMARY OF THE INVENTION

The present invention has been made in view of the above problems, and an object thereof is to restrain variations of etched states and decreases in etching rate due to adhesion of films to the portions surrounding the substrate.

A method of manufacturing a magnetic recording medium, includes forming a first film on a substrate holder not having a substrate mounted thereon, mounting a substrate on the substrate holder having the first film formed thereon, the substrate having a resist layer formed on a multilayer film including a magnetic film layer, the resist layer having a predetermined pattern, and processing the magnetic film layer into a shape based on the predetermined pattern by performing dry etching on the substrate, the first film being a film that is not etched as easily as films in the multilayer film removed by the dry etching.

According to the present invention, decreases in etching rate during the manufacture of a magnetic recording medium can be restrained.

DETAILED DESCRIPTION OF THE INVENTION

<Layer Structure and Manufacturing Process>

FIGS. 1A to 1J are diagrams showing an example of the stack structure of an object in a manufacturing flow and the respective procedures for manufacturing a magnetic recording medium to which the present invention can be applied. The film structure is shown in cross-sectional views, but hatchings are not drawn for ease of comprehension of the drawings.

Figure 1A:
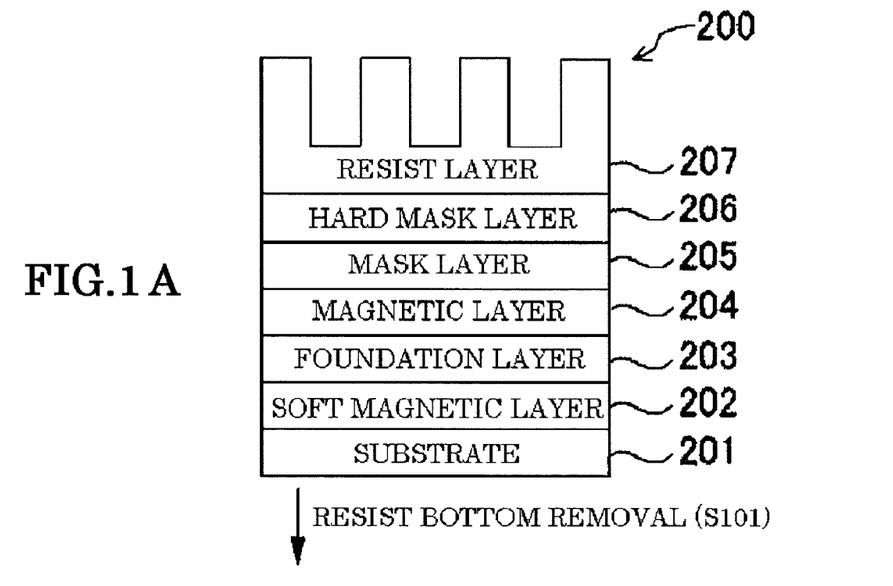
FIGS. 1A to 1J show diagrams illustrating a flow to manufacture a magnetic recording medium to which the present invention can be applied.

The film stack (a substrate having a predetermined-pattern resist layer formed on a multilayer film including a magnetic film layer) 200 is a structure to be processed into a DTM, and includes a substrate 201, a soft magnetic layer 202, a foundation layer 203, a recording magnetic layer (a magnetic film layer) 204, a mask layer 205, a hard mask layer 206, and a resist layer 207, as shown in FIG. 1A. The film stack is introduced into the manufacturing apparatus illustrated in FIG. 2. As the substrate 201, a glass substrate or an aluminum substrate of 2.5 inches (65 mm) in diameter can be used, for example. The soft magnetic layer 202 is a layer that serves as the yoke of the recording magnetic layer 204, and is made of a soft magnetic material such as a Fe alloy or a Co alloy. The foundation layer 203 is a layer for vertically orienting the easy axis of the recording magnetic layer 204 (in the stacking direction of the film stack 200), and is formed with a film stack of metal films such as a Ru film and a Ta film. The recording magnetic layer 204 is a layer magnetized in a direction perpendicular to the substrate 201, and is a granular film or the like made of a Co alloy, an oxide, or the like.

The mask layer 205 is designed for forming grooves in the recording magnetic layer 204, and diamond-like carbon (DLC) or the like can be used as the mask layer 205. The mask may not be a single layer. Instead, a metal film layer such as a Ta or a oxide film layer such as a $SiO_2$ film may be formed into the hard mask layer 206 which is a material layer with a high selectivity for the mask layer 205.

The resist layer 207 is a layer for transferring the groove pattern onto the recording magnetic layer 204. In this embodiment, the groove pattern is transferred onto the resist layer 207 by a nanoimprint technique. By the nanoimprint technique, grooves arranged in a predetermined pattern are formed by pressing a mold against the flat resist layer 207. The groove pattern may be transferred by photolithography, instead of the nanoimprint technique.

Figure 1B:
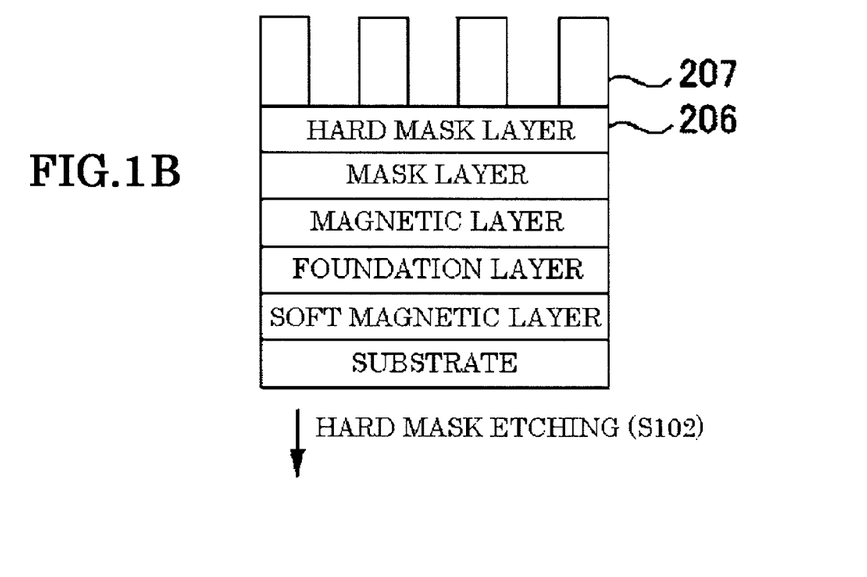

A dry etching operation is performed on the film stack 200, to process the recording magnetic layer 204 into a shape based on the predetermined pattern. Specifically, a resist bottom removal is performed in step S101, to remove the bottom portions of the grooves in the resist layer 207 and expose the hard mask layer 206 (FIG. 1B). This process is performed by reactive ion etching (RIE) using a gas containing the oxygen element such as an oxygen gas or an ozone gas.

Figure 1C:
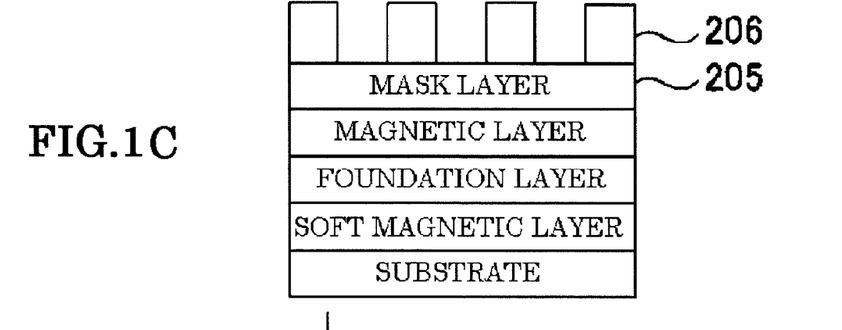

In step S102, with the resist layer 207 serving as a mask, etching is performed on the hard mask layer 206, to process the hard mask layer 206 into a pattern (FIG. 1C). This process is performed by reactive ion etching using a halogen-based etching gas such as a carbon tetrafluoride gas.

Figure 1D:
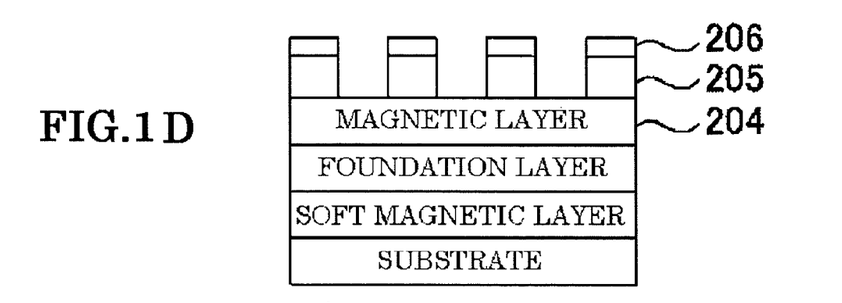

In step S103, with the hard mask layer 206 serving as a mask, etching is performed on the mask layer 205, to process the mask layer 205 into a pattern (FIG. 1D). This process is performed by reactive ion etching using an oxygen gas.

Figure 1E:
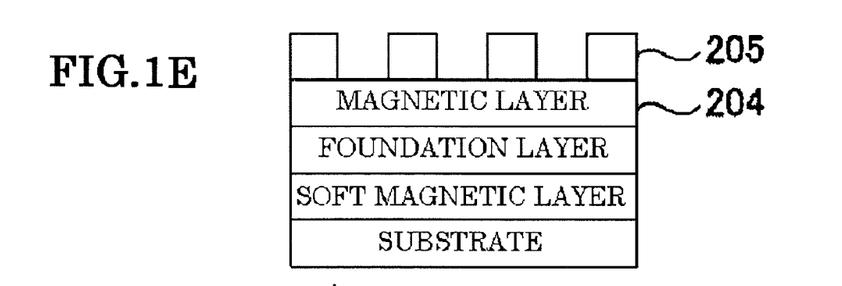

In step S104, the portions of the hard mask layer 206 remaining on the mask layer 205 after step S103 are removed (FIG. 1E). This process is performed by reactive ion etching using a halogen-based etching gas, for example.

Figure 1F:
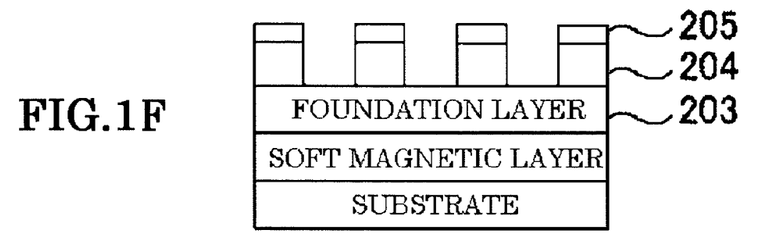

In step S105, with the mask layer 205 serving as a mask, etching is performed on the recording magnetic layer 204, to form the recording magnetic layer 204 into a pattern in which the respective tracks are at a distance from one another in a radial direction (FIG. 1F). For example, the pitch (the groove width+the track width) is 70 to 100 nm, the groove width is 20 to 50 nm, and the thickness of the recording magnetic layer 204 is 4 to 20 nm. This process is performed by ion beam etching using an inactive gas such as an Ar gas as an ion source, for example.

Figure 1G:
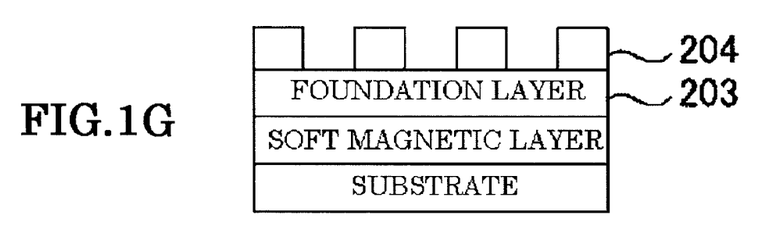

In step S106, the portions of the mask layer 205 remaining after step S105 are removed (FIG. 1G). This process can be the same process as the etching process for the mask layer 205 of step S103, for example.

Figure 1H:
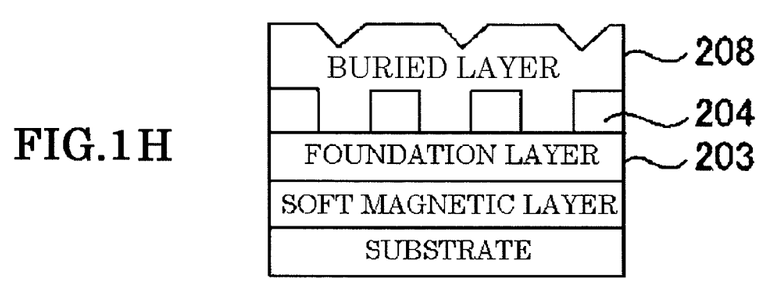

In step S107, a buried layer 208 is formed on the recording magnetic layer 204 formed into a pattern, to fill the grooves formed on the surface of the film stack 200 (FIG. 1H). The buried layer 208 is made of a nonmagnetic material (Cr, Ti, or an alloy of Cr or Ti, for example), and is formed by sputtering with an applied bias voltage, for example.

Figure 1I:
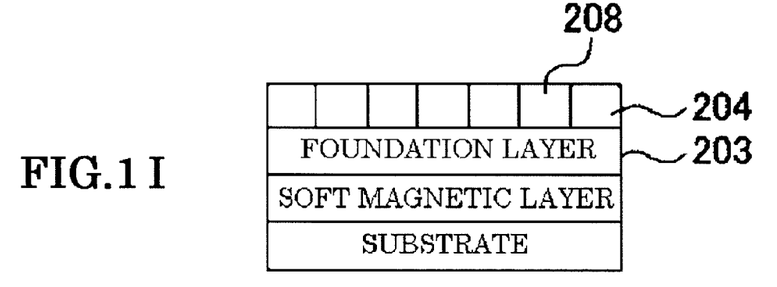

In step S108, flattening is performed on the buried layer 108, to expose the recording magnetic layer 204 (FIG. 1I). This process is performed by ion beam etching using an inactive gas such as an Ar gas as an ion source.

Figure 1J:
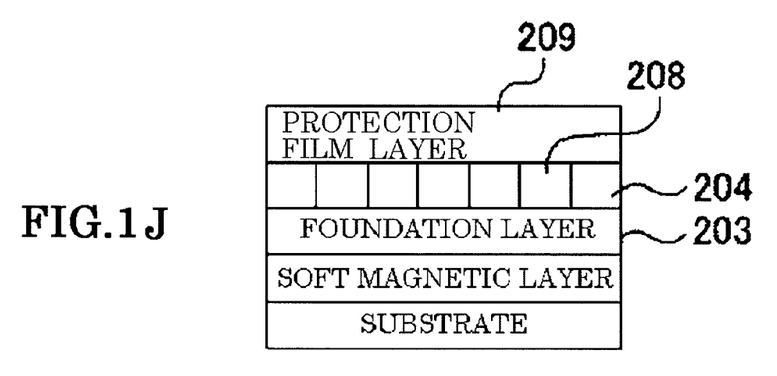

In step S109, a protection film layer 209 is formed on the buried layer 208 and the recording magnetic layer 204 (FIG. 1J). The protection film layer 209 can be made of DLC, for example, and can be formed by plasma CVD or the like.

<Structure of the Manufacturing Apparatus>

Figure 2:
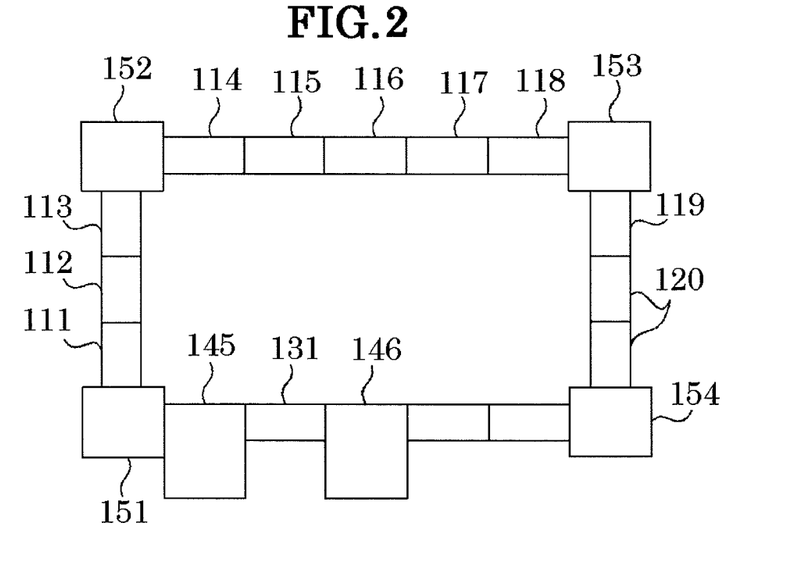
FIG. 2 is a schematic plan view of an example structure of an apparatus for manufacturing the magnetic recording medium.

FIG. 2 is a schematic view showing an example structure of a manufacturing apparatus that can execute the above-mentioned manufacturing flow.

The manufacturing apparatus of FIG. 2 is an inline-type manufacturing apparatus in which evacuable chambers such as 111 through 120 are connected and arranged in an endless rectangle. A transportation path for transporting each substrate to an adjacent vacuum chamber is formed in each of the chambers, and each substrate is processed sequentially in the respective vacuum chambers while circulating in the manufacturing apparatus. The transportation direction of each substrate is changed in direction switching chambers 151 through 154. The direction switching chambers 151 through 154 change the transportation direction of each substrate linearly transported through chamber. And the direction switching chambers hand over each substrate to the next chamber. Each substrate is introduced into the manufacturing apparatus by a load lock chamber 145. When the processing is completed, each substrate is carried out of the manufacturing apparatus by an unload lock chamber 146. The substrate holder holding a substrate passes through a chamber 131, and moves back to the load lock chamber 145. A new substrate is then placed on the holder. Like the chamber 120, chambers that can perform the same processing may be arranged in a row, and the same processing may be divided into several steps to be carried out. In this manner, a time-consuming operation can be performed without an increase in takt time.

Specifically, the chamber 111 can be the RIE chamber for removing the bottom portions of the resist layer 207. The chamber 112 can be the RIE chamber for performing etching on the hard mask layer 206. The chamber 113 can be the RIE chamber for performing etching on the mask layer 205. The chamber 114 can be the RIE chamber for removing the hard mask layer 206. The chamber 115 can be the IBE chamber for performing etching on the recording magnetic layer 204. The chamber 116 can be the RIE chamber for removing the mask layer 205. The chamber 117 can be the sputtering chamber for forming the buried layer 208. The chamber 118 can be the IBE chamber for performing flattening. The chamber 119 can be the heating chamber for heating each substrate to a temperature high enough to form the protection film layer 209. The chamber 120 can be the plasma CVD chamber for forming the protection film layer 209.

Further, in this embodiment, the holder film forming chamber 131 is provided between the unload lock chamber 146 and the load lock chamber 145, and a first film forming operation is performed on the substrate holder not holding a substrate.

Figure 3:
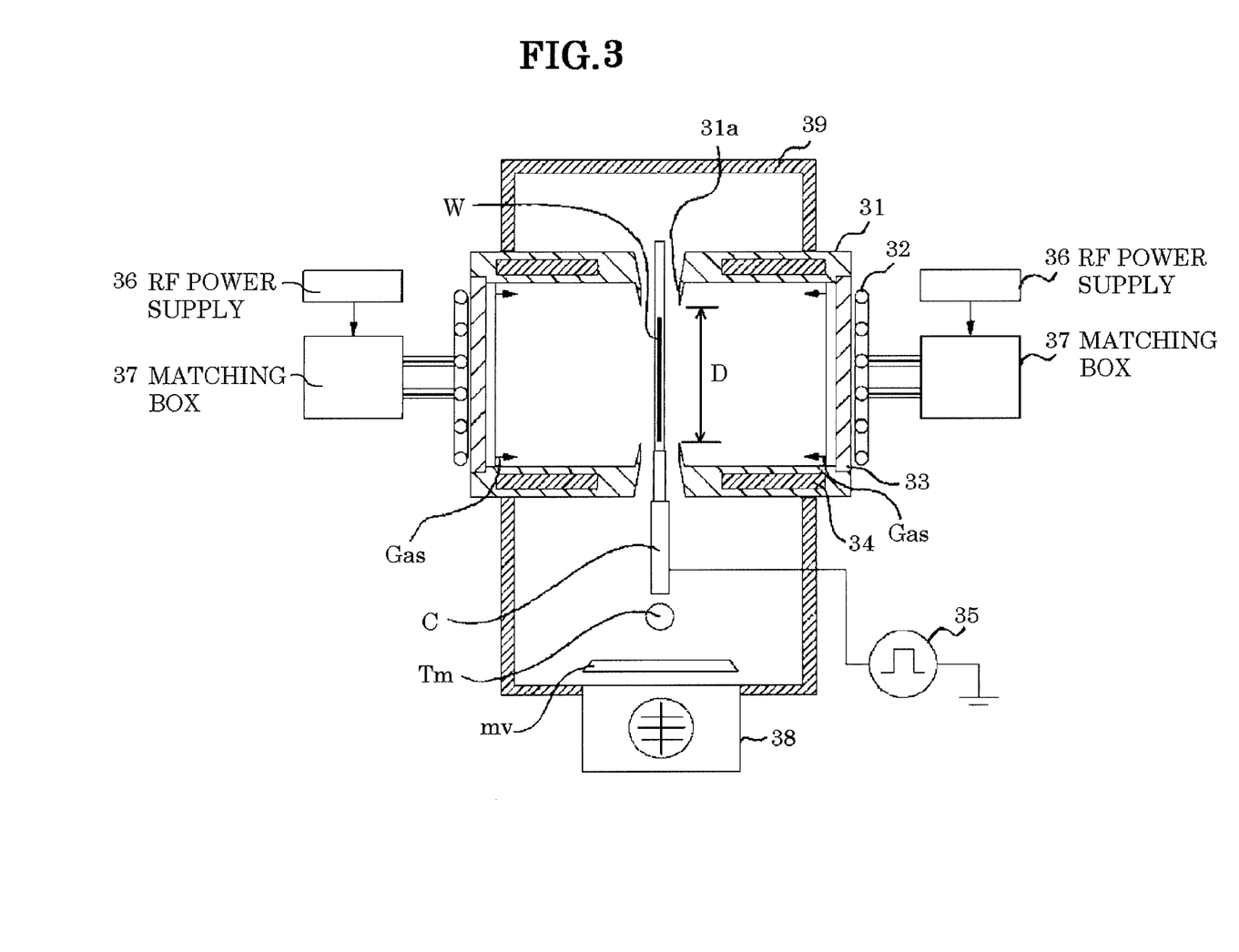
FIG. 3 is a schematic transverse sectional view of an example structure of a RIE chamber.

FIG. 3 illustrates an example structure of a RIE chamber.

A RIE chamber 39 includes discharge tubes 31 in which plasmas are generated through gaseous discharges. The RIE chamber 39 is connected to a gas supply system that supplies gases (reactive gases and discharge gases) to the discharge tubes 31. And the RIE chamber 39 includes a radiofrequency power application mechanism that applies radio-frequency power to the gases in the discharge tubes 31. The radiofrequency power application mechanism includes antennas 32, radiofrequency power supplies 36 that supply radiofrequency current to the antenna 32 to induce radiofrequency magnetic fields in the discharge tubes 31, and matching boxes 37 that are provided in the circuits between the radiofrequency power supplies 36 and the antennas 32.

As shown in FIG. 3, the discharge tubes 31 are cylindrical housings that are located between a substrate W and the antennas 32, and are open on the substrate side. Ring-like shields 31a for restraining the plasmas from flowing into regions other than the substrate W are provided at the opening portions of the discharge tubes 31 on the substrate W sides. Specifically, each shield 31a is open at a location that is inside the opening of the main frame of each corresponding discharge tube 31 and faces the substrate W. The inner diameter D of the shields 31a is smaller than the inner diameter of the discharge tubes 31, and is also smaller than the shield inner diameter D' of the holder film forming chamber 131 as will be described later.

Discharge windows 33 made of a dielectric material are provided on the opposite ends of the discharge tubes 31 from the substrate W. The antennas 32 are coils that are wound around the axes of the discharge tubes 31 or axes deviating from the axes of the discharge tubes 31. As the radiofrequency power supplies 36, power supplies that supply power at any frequencies in the range of several hundreds of kHz to several tens of MHz are used. The gas supply system includes gas cylinders that store the gases to be supplied, pipes that connect the cylinders and the discharge tubes 31, valves provided in the pipes, flow rate adjusters, and filters, though not shown in the drawing. Reference numeral 34 indicates magnets that are provided inside the tube walls of the discharge tubes 31, to control the plasma forming state.

The pair of discharge tubes 31 are provided to face both surfaces of the substrate W that is held by the substrate holder C in such a state that the substrate surfaces are vertical (a vertical state), as shown in FIG. 3. Likewise, the antennas 32, the discharge windows 33, and the magnets 34 are arranged to face the both surfaces of the substrate W. With this arrangement, etching can be performed simultaneously on the both surfaces of the substrate W.

The substrate holder C is transported between the chambers and in the chambers by a transportation unit Tm. An exhaust unit (a turbo-molecular pump) 38 is also provided, so that decompression can be performed to a predetermined pressure (a vacuum state). A bias application mechanism 35 for applying a pulse bias to the substrate holder C is connected to the substrate holder C, and high-precision etching can be performed. In the drawing, my represents the main valve that hermetically closes the chamber 39 and opens the chamber 39 toward the exhaust unit 38.

Figure 4:
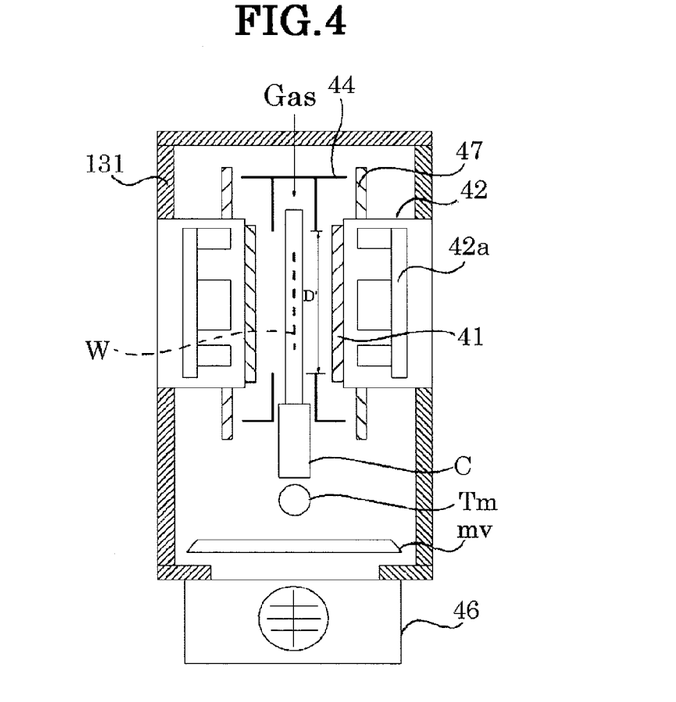
FIG. 4 is a schematic transverse sectional view of an example structure of a holder film forming chamber.

FIG. 4 illustrates an example structure of the holder film forming chamber 131.

The holder film forming chamber 131 is designed to include cathode units 42 to which targets 41 can be attached, an exhaust unit (a turbo-molecular pump) 46, and a main valve mv. Each of the cathode units 42 includes an electrode and a magnet mechanism 42a provided in the space inside the electrode. The electrode is connected to a power supply (a DC power supply, an AC power supply, or a DC and AC power supply), and supplies power to the target 41. The magnet mechanism 42a forms a predetermined rotating magnetic field on the surface of the target 41, to enable magnetron sputtering. The cathode units 42 are provided on both sides of the substrate holder C, so that films can be formed on the both surfaces of the substrate holder C.

First shields 44 extending from sides of the substrate W toward the center of the substrate W are provided between the targets 41 and the substrate W, and restrain sputtering particles from entering the regions outside the substrate W. Second shields 47 preventing attachment of target particles to the inner walls of the chamber are also provided on the back sides of the targets 41. In this embodiment, the inner diameter D' of each first shield 44 is greater than the inner diameter D of the shields 31a of each RIE chamber. Accordingly, film formation can be performed on larger areas of the substrate holder C than the areas in which etching is performed by each RIE chamber, and the areas in which the substance removed by etching re-adheres.

In the holder film forming chamber 131, a film made of a material that is not etched as easily as the object to be etched (the film in the multilayer film to be removed by dry etching) or a film made of a material having a lower reactivity to etching gases is formed as a first film. Examples of such materials include chromium and an alloy containing chromium. In a case where chromium is used, the reactivity to halogen-based etching gases and etching gases containing the oxygen element is low, and has a greater effect to restrain decreases in etching rate than in a case where the etched substance remains adhering to the substrate holder, as will be described later. Accordingly, chromium can be suitably used in a manufacturing apparatus that carries out the series of procedures described as the flow according to this embodiment. Also, as will be described later, in a case where passivation is performed by an oxygen plasma, aluminum or an alloy containing aluminum can be used.

In Japanese Patent Application Laid-Open No. 2001-156158, etching is performed on DLC adhering to the holder between the unload lock chamber 146 and the load lock chamber 145. If the etching amount is not sufficient, however, the etching rate in the reactive ion etching in the chamber 111 and the like becomes lower, and the grooves in the resist layer on a new substrate cannot be removed by the amount equivalent to a predetermined film thickness. Also, in a case where a hard mask made of Ta or the like is used, the substrate holder is also made of a metallic material according to the method disclosed in Japanese Patent Application Laid-Open No. 2001-156158. Therefore, the metallic material cannot be sufficiently removed by etching. Where the material of the etched hard mask remains adhering to the substrate holder, the etching rate of the hard mask also becomes lower, and the pattern cannot be transferred.

According to this embodiment, holder film formation is performed so that the etched substance is covered with a material that is not easily etched. In this manner, the above-mentioned problems can be solved.

<Modification>

Figure 5:
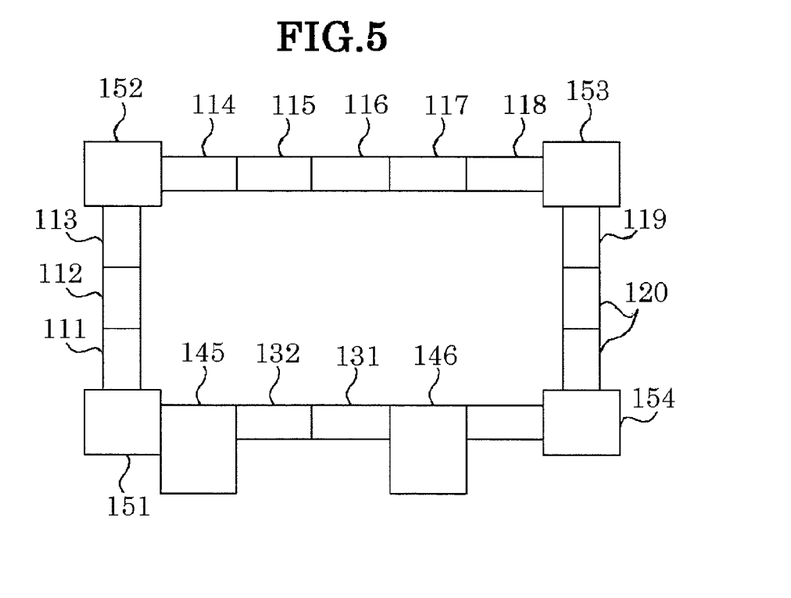
FIG. 5 is a schematic plan view of another example structure of an apparatus for manufacturing the magnetic recording medium.

FIG. 5 illustrates a modification of the present invention. The manufacturing apparatus of FIG. 5 is almost the same as the manufacturing apparatus of FIG. 2, except that, in addition to the holder film forming chamber 131, a holder etching chamber 132 is provided on the downstream side of the holder film forming chamber 131 in the transporting direction of the substrate holder C between the unload lock chamber 146 and the load lock chamber 145. This aspect will be mainly described in the following.

Figure 6:
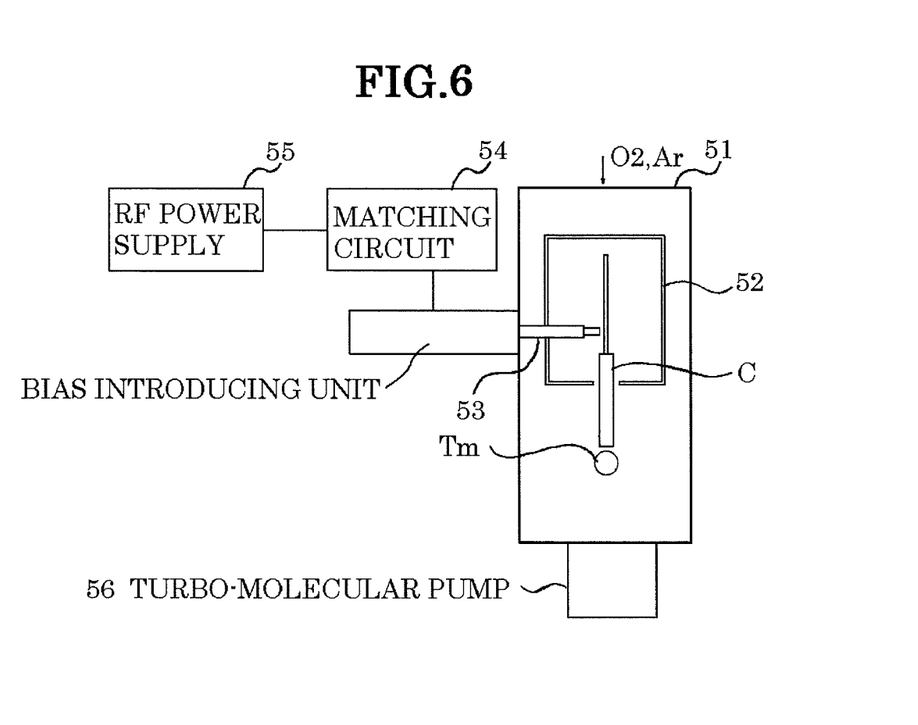
FIG. 6 is a schematic transverse sectional view of an example structure of a holder etching chamber.

FIG. 6 shows an example structure of the holder etching chamber 132. The holder etching chamber 132 includes a gas introduction system that introduces a gas, a radiofrequency power supply 55 that causes radiofrequency discharge in the introduced gas, a bias introducing unit that includes a movable electrode 53, and an exhaust unit (a turbo-molecular pump) 56. The movable electrode 53 has an electrode bar that can be moved by a drive mechanism (not shown). When the substrate holder C is transported into the chamber 132, the movable electrode 53 is brought into contact with the substrate holder C, and applies a voltage. The discharge space around the substrate holder C is covered with a shield 52, and prevents any removed film from adhering to the chamber walls.

In the holder etching chamber 132, after the first film such as a chromium film is formed on the substrate holder C, the film that fails to be covered with the first film and is exposed through the surface is removed by etching. At this point, only an inactive gas may be introduced, and only sputtering etching may be performed. Alternatively, a gas containing the oxygen element, such as an oxygen gas, may be introduced so as to react with the carbon forming the mask layer 205, the resist 207, and the protection film layer 209, and the exposed film may be removed. By introducing a gas containing the oxygen element, such as an oxygen gas, the first film is passivated through an oxidation treatment, and a more stable state can be achieved.

The sequence of connection between the holder film forming chamber 131 and the holder etching chamber 132 may be reversed, or the holder film forming chamber 131 may be provided on the downstream side of the holder etching chamber 132 in the transporting direction. Since a diamond-like carbon (DLC) film that is normally used as the protection film layer 209 has a high stress, the first film formed on a DLC film might lead to poor adhesiveness, and might come off the DLC film due to the difference in stress. However, the film peeling can be prevented by performing holder film formation after etching.

It should be noted that the present invention can be applied not only to the above described embodiment. Although the hard mask layer 206 is used in this embodiment, the hard mask layer 206 may not be used, and etching may be performed on the magnetic layer 204 only with the resist layer 207 and the mask layer 205 serving as masks, for example. Also, the holder film formation does not need to be performed every time, and may be performed only once in a few times. Further, the holder film forming chamber 131 may not be provided between the unload lock chamber 146 and the load lock chamber 145, and the holder film formation may be performed in a holder film forming chamber connected as a branch to the endless line.

EXAMPLES

A test to confirm the effects of the present invention was conducted in an example case where a chromium film was used as the first film.

The following test was conducted to evaluate the influence of the etched substance adhering to the substrate holder C on the etching rate when etching was performed on the resist layer 207 and the mask layer 205.

The test conditions were as follows. The RIE chamber illustrated in FIG. 3 was used, and etching was performed on a sputtered carbon film formed on a substrate, with a RF power of 200 W, a pulse DC-Bias of −50 V, a 60-sccm Ar gas, a 10-sccm $O_2$ gas, and a chamber pressure of 0.24 Pa. In the example of the present invention, a substrate holder C having a chromium film formed on a matrix (aluminum) was used. In a comparative example, a substrate holder C having a carbon film formed as a material to be etched was used. The etching amount of the carbon film formed on each of the substrates held by the respective substrate holders C was checked.

Figure 7:
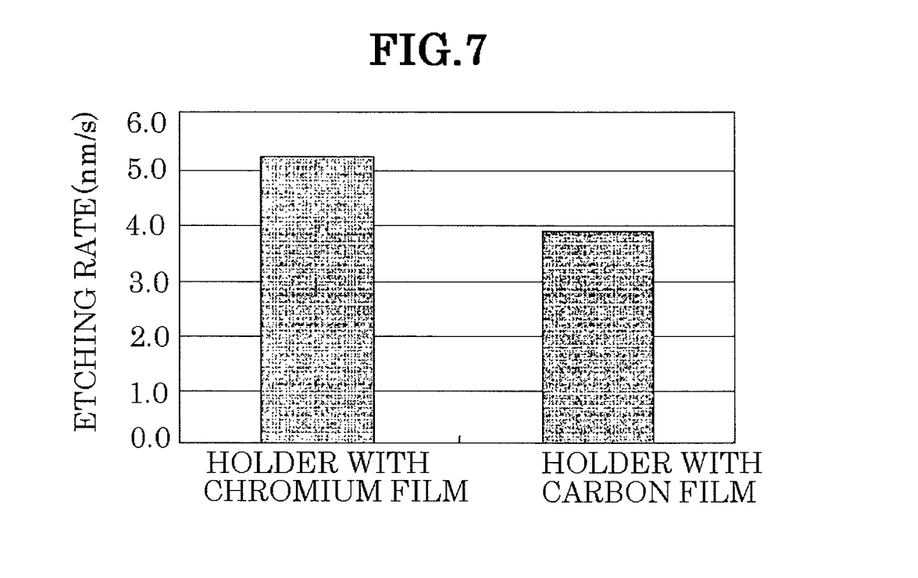
FIG. 7 shows graphs for comparing the etching rate in the case of a holder having a carbon film with the etching rate in the case of a holder having a chromium film.

As a result, the etching rate in the case of the substrate holder C with the carbon film was 3.8 nm/s, and the etching rate in the case of the substrate holder C with the Cr film was 5.2 nm/s, as shown in FIG. 7. It was confirmed that the etching rate in the case of the substrate holder C having the carbon film formed thereon was made lower than that in the case of the substrate holder C with the Cr film, and the etching amount in the case of the substrate holder C with the carbon film did not reach the required etching amount. Also, the productivity became lower due to the decrease in etching rate.

Figure 8:
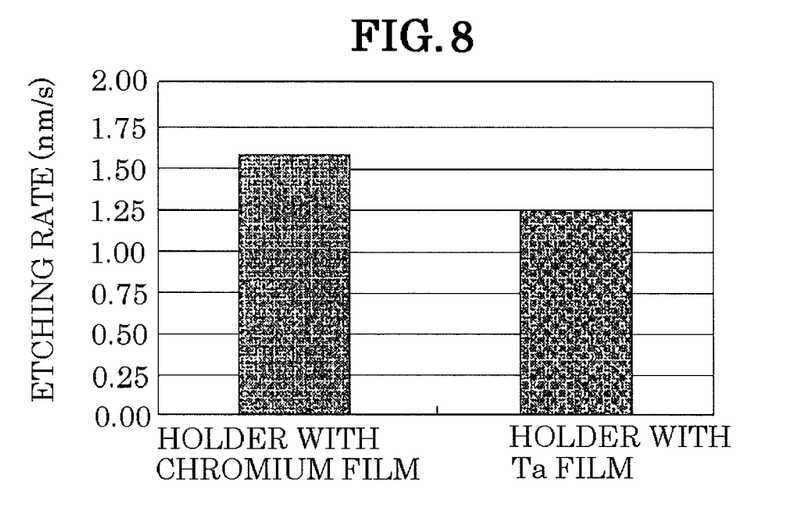
FIG. 8 shows graphs for comparing the etching rate in the case of a holder having a chromium film with the etching rate in the case of a holder having a Ta film.

Likewise, the following test was conducted to evaluate the influence of the etched substance adhering to the substrate holder C on the etching rate when etching was performed on the hard mask layer 206. A substrate holder having a Ta film that is to be used as the hard mask layer 206 and is to be etched was used, and a holder having a chromium film having a low reactivity to etching gases was used. Etching was performed on the Ta film on the substrate with a $CF_4$ gas. As a result, the etching rate in the case of the holder with the Ta film was 1.25 nm/s, and the etching rate in the case of the holder with the chromium film was 1.58 nm/s, as shown in FIG. 8.

As can be seen from the above results, decreases in etching rate can be restrained by forming a chromium film in both cases where etching is performed on a carbon-based film and where etching is performed on a metal film. Other films adhering to the holder may be the above described protection film layer 209 and the buried layer 208. If the buried layer 208 is made of a metal, the buried layer 208 readily reacts with an etching gas containing $CF_4$ or alcohol. The protection film layer 209 readily reacts with an oxygen gas. Therefore, reactions with the buried layer 208 and the protection film layer 209 can be prevented by forming a chromium film.

What is claimed is:

1. A method of manufacturing a magnetic recording medium, comprising:
    a first step of forming a first film on a substrate holder not having a substrate mounted thereon;
    a second step of mounting a substrate on the substrate holder having the first film formed thereon, the substrate having a resist layer formed on a multilayer film including a magnetic film layer, the resist layer having a predetermined pattern;
    a third step of processing the magnetic film layer into a shape based on the predetermined pattern by performing dry etching on the substrate held by the substrate holder; and
    a fourth step of forming a deposited film on the substrate held by the substrate holder,
    wherein the first step to the fourth step are performed in numerical order,
    the first film is a film that is not etched as easily as films in the multilayer film removed by the dry etching, and
    the first step to the fourth step are performed using a manufacturing apparatus having evacuable chambers and a transportation path for transporting a substrate to an adjacent vacuum chamber.

2. The method according to claim 1, wherein the substrate is carried out of the manufacturing apparatus when the fourth step is completed.

3. The method according to claim 2, wherein, after the substrate is carried out of the manufacturing apparatus, another substrate is placed on the substrate holder.

* * * * *